United States Patent
Biswas et al.

(10) Patent No.: US 7,801,235 B2
(45) Date of Patent: Sep. 21, 2010

(54) METHOD AND APPARATUS FOR ACHIEVING MULTIPLE ANTENNA DIVERSITY WITH TWO ANTENNA PER PACKET DIVERSITY IN A WIRELESS NETWORK

(75) Inventors: Ashim Biswas, Karnataka (IN); Xintian E. Lin, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 1511 days.

(21) Appl. No.: 10/929,664

(22) Filed: Aug. 30, 2004

(65) Prior Publication Data

US 2006/0045220 A1    Mar. 2, 2006

(51) Int. Cl.
*H04B 7/02* (2006.01)
(52) U.S. Cl. .............. 375/267; 375/130; 375/135; 375/136; 375/144; 375/147; 375/148; 375/150; 375/219; 375/220; 375/146; 375/264; 375/260; 375/299; 375/316; 375/346; 375/347; 375/349
(58) Field of Classification Search ............ 375/130, 375/135–136, 144, 146–148, 150, 220, 264, 375/267, 260, 295, 299, 316, 346–347, 349
See application file for complete search history.

(56) References Cited

U.S. PATENT DOCUMENTS

| | | | |
|---|---|---|---|
| 5,852,630 A * | 12/1998 | Langberg et al. | 375/219 |
| 6,085,076 A * | 7/2000 | Lindsay et al. | 455/277.1 |
| 6,292,516 B1 * | 9/2001 | Petsko et al. | 375/267 |
| 6,456,675 B2 * | 9/2002 | Wagner et al. | 375/347 |
| 6,721,550 B1 * | 4/2004 | Okada et al. | 455/277.1 |
| 7,035,612 B2 * | 4/2006 | Kishimoto et al. | 455/277.1 |
| 7,359,692 B2 * | 4/2008 | Saed et al. | 455/277.1 |
| 2003/0161410 A1 * | 8/2003 | Smith et al. | 375/267 |
| 2005/0185707 A1 * | 8/2005 | Hoo et al. | 375/224 |
| 2005/0208897 A1 * | 9/2005 | Lyons et al. | 455/67.11 |

* cited by examiner

*Primary Examiner*—Shuwang Liu
*Assistant Examiner*—Kabir A Timory
(74) *Attorney, Agent, or Firm*—Thorpe North & Western LLP

(57) ABSTRACT

A wireless communication device that includes more than two antennas considers only two of those antennas for use in receiving any particular wireless packet. During reception of an initial portion of a wireless packet, a quality metric may be measured for each of the two antennas being considered. One of the two antennas may then be selected to receive a payload portion of the wireless packet based on the measured metrics. In at least one embodiment, a different pair of antennas is considered for each successive received packet.

21 Claims, 5 Drawing Sheets

METHOD AND APPARATUS FOR ACHIEVING MULTIPLE ANTENNA DIVERSITY WITH TWO ANTENNA PER PACKET DIVERSITY IN A WIRELESS NETWORK

TECHNICAL FIELD

The invention relates generally to wireless communications and, more particularly, to techniques and structures for providing antenna diversity in wireless systems.

BACKGROUND OF THE INVENTION

In a wireless communication link, a transmitted signal will often traverse multiple paths to its destination. That is, in addition to a direct path between the transmitter and the receiver, one or more other paths may exist that involve reflection of the transmitted signal from objects, structures, or natural occurrences in the environment about the link. Depending upon the lengths of the various paths, it is possible that the different signal components received at the receiver will be out of phase with one another, thus canceling one another out and resulting in a very low receive signal strength. This phenomena is known as multipath fading. To overcome multipath fading, a technique known as antenna diversity may be employed. In antenna diversity, a number of independent receive antennas are used with the expectation that multipath fading will rarely, if ever, occur at all of the antennas at the same time. Thus, even though one antenna may experience a high degree of fading at a particular point in time, another antenna may be in a position where the various paths combine in a additive manner to achieve a relatively strong signal. Different types of antenna diversity may be employed. In one type, for example, the outputs of all of the receive antennas may be combined in some manner to achieve a strong overall receive signal. Although effective, this type of antenna diversity may be complex and expensive to implement. In another possible technique, an antenna selection approach may be used. That is, during a receive operation, a signal quality measurement may be made for each of the receive antennas associated with a device and one of the antennas may then be selected based on the measurement results. In wireless networks implementing this type of antenna diversity, the quality measurement is often made during a header portion of a received signal packet. However, in many wireless networking standards, packet headers are relatively short, leaving little extra time for performing antenna diversity related measurements.

DETAILED DESCRIPTION

Figure 1:
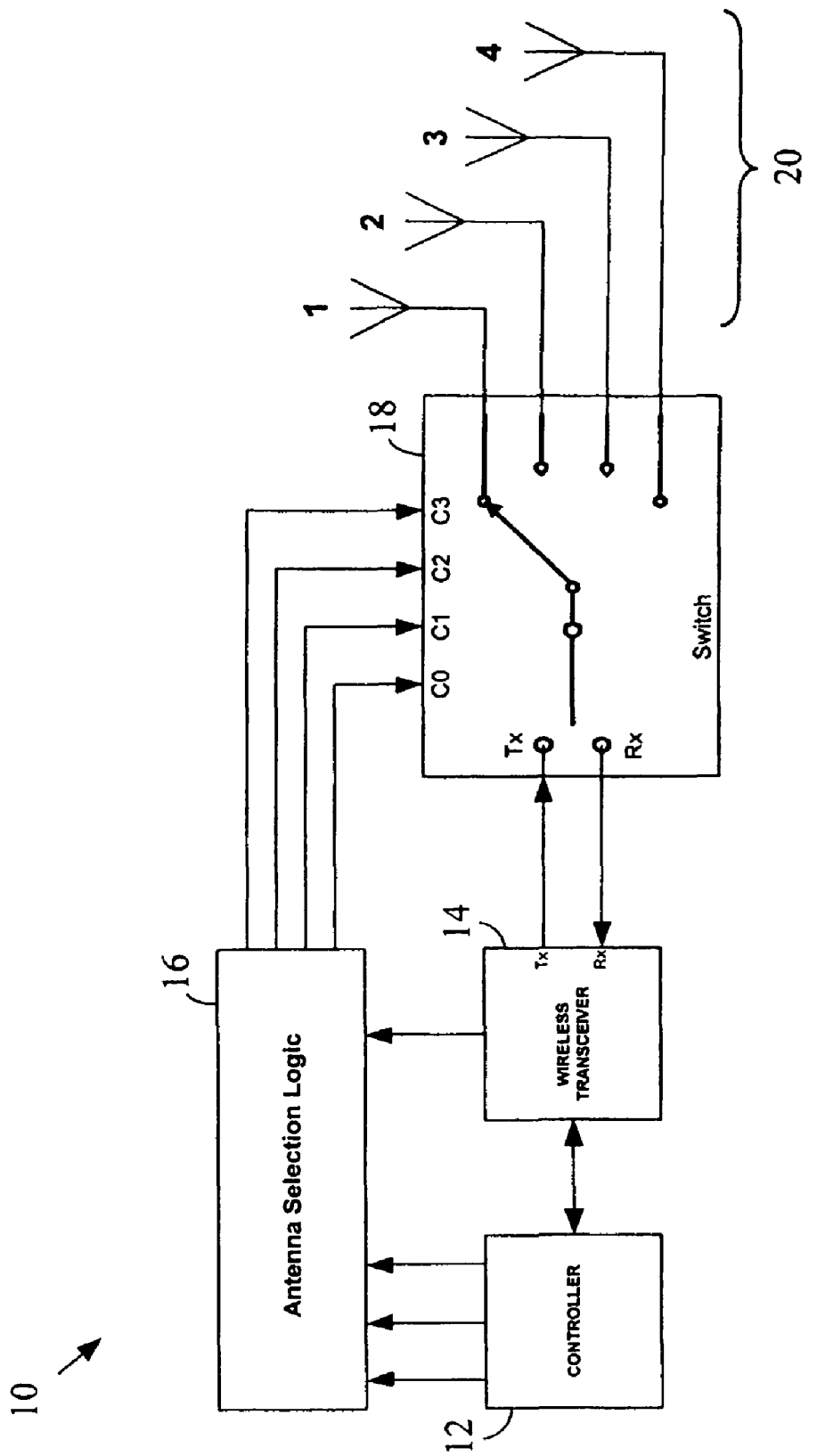
FIG. 1 is a block diagram illustrating an example wireless communication device in accordance with an embodiment of the present invention.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIG. 1 is a block diagram illustrating an example wireless communication device 10 in accordance with an embodiment of the present invention. In at least one application, the wireless communication device 10 may be used within a high throughput wireless network. Many other applications also exist. As illustrated, the wireless communication device 10 may include: a controller 12, a wireless transceiver 14, antenna selection logic 16, a switch 18, and a plurality of antennas 20. The switch 18 is operative for controllably coupling a selected antenna in the plurality of antennas 20 to the wireless transceiver 14. During transmit operations, the selected antenna may be coupled to a transmitter portion of the wireless transceiver 14. Similarly, during receive operations, the selected antenna may be coupled to a receiver portion of the wireless transceiver 14. The controller 12 may perform, among other things, baseband processing functions within the wireless communication device 10. The antenna selection logic 16 is operative for, among other things, generating antenna selection control signals that are delivered to the switch 18 to select a desired antenna. The antenna selection logic 16 may receive inputs from the wireless transceiver 14 and/or the controller 12 to use in generating the antenna selection control signals.

In at least one embodiment, the wireless communication device 10 of FIG. 1 may be used in a wireless network where data is transferred in packets. For each packet received by the communication device 10 while in receive mode, the device 10 will want to select and use an appropriate antenna from the plurality of antennas 20 as a form of antenna diversity. Antenna selection functions may be performed, for example, during a header portion of a received packet. That is, during the packet header, a quality metric (e.g., received signal strength, etc.) may be measured for each antenna and the antenna having the best metric value may be selected for use in receiving the remainder of the packet. However, in some systems, packet headers are relatively short and may not allow enough time for all of the available antennas in a system to be measured during a single packet. This problem will only get worse as more antennas are added to a system. In one aspect of the present invention, this problem is dealt with by limiting the number of antennas that are considered for use during a single received packet to two. This technique may be referred to as two antenna per packet diversity. Other available antennas may then be considered when receiving subsequent packets in the system. In this manner, all available antennas may eventually be considered for use, over a series of received packets.

The plurality of antennas 20 may include three or more antennas. In at least one embodiment of the invention, the plurality of antennas 20 includes four sectored antennas. Each of the four sectored antennas may have an associated antenna beam that covers a 90 degree sector. By using directional, sectored antennas, both coverage and range may be improved over systems using multiple omni-directional antennas (although, in some embodiments, omni-directional antennas are used). As an alternative to four 90 degree sectored antennas, other sectored antenna arrangements may also be used (e.g., three sectored antennas, six sectored antennas, etc.). In the discussion that follows, a four antenna implementation is described.

In the illustrated embodiment, the switch 18 is a 2×4 radio frequency (RF) switch. One part of the switch 18 may be used to select a desired antenna out of the plurality of antennas 20. Another part of the switch 18 may be used to toggle between transmit and receive mode. When in transmit mode, the switch 18 may couple a selected antenna to the output of a transmitter portion of the wireless transceiver 14. When in receive mode, the switch 18 may couple a selected antenna to the input of a receiver portion of the wireless transceiver 14. Other switch configurations may alternatively be used. In the illustrated embodiment, the switch 18 includes four control signal inputs (i.e., C0, C1, C2, and C3). The digital values applied to these four inputs will determine which antenna in the plurality of antennas 20 will be coupled to the transceiver 14. In at least one implementation, the antenna corresponding to a particular control signal configuration may be different for receive mode and transmit mode. Table 1 below illustrates an example of one possible control signal scheme that may be used. As shown, the location of a single "1" on one of the four control signal inputs will determine which of the four antennas will be coupled to the wireless transceiver 14. In addition, the antenna corresponding to a particular control signal is different for transmit and receive modes. For example, control signals C0=0, C1=1,

TABLE 1

| C0 | C1 | C2 | C3 | Tx | Rx |
|---|---|---|---|---|---|
| 1 | 0 | 0 | 0 | ANT-1 | ANT-3 |
| 0 | 1 | 0 | 0 | ANT-3 | ANT-1 |
| 0 | 0 | 1 | 0 | ANT-4 | ANT-2 |
| 0 | 0 | 0 | 1 | ANT-2 | ANT-4 |

C2=0, and C3=0 will select antenna 3 during transmit mode and antenna 1 during receive mode, and so on. It should be appreciated that other control signal schemes may alternatively be used.

Figure 2:
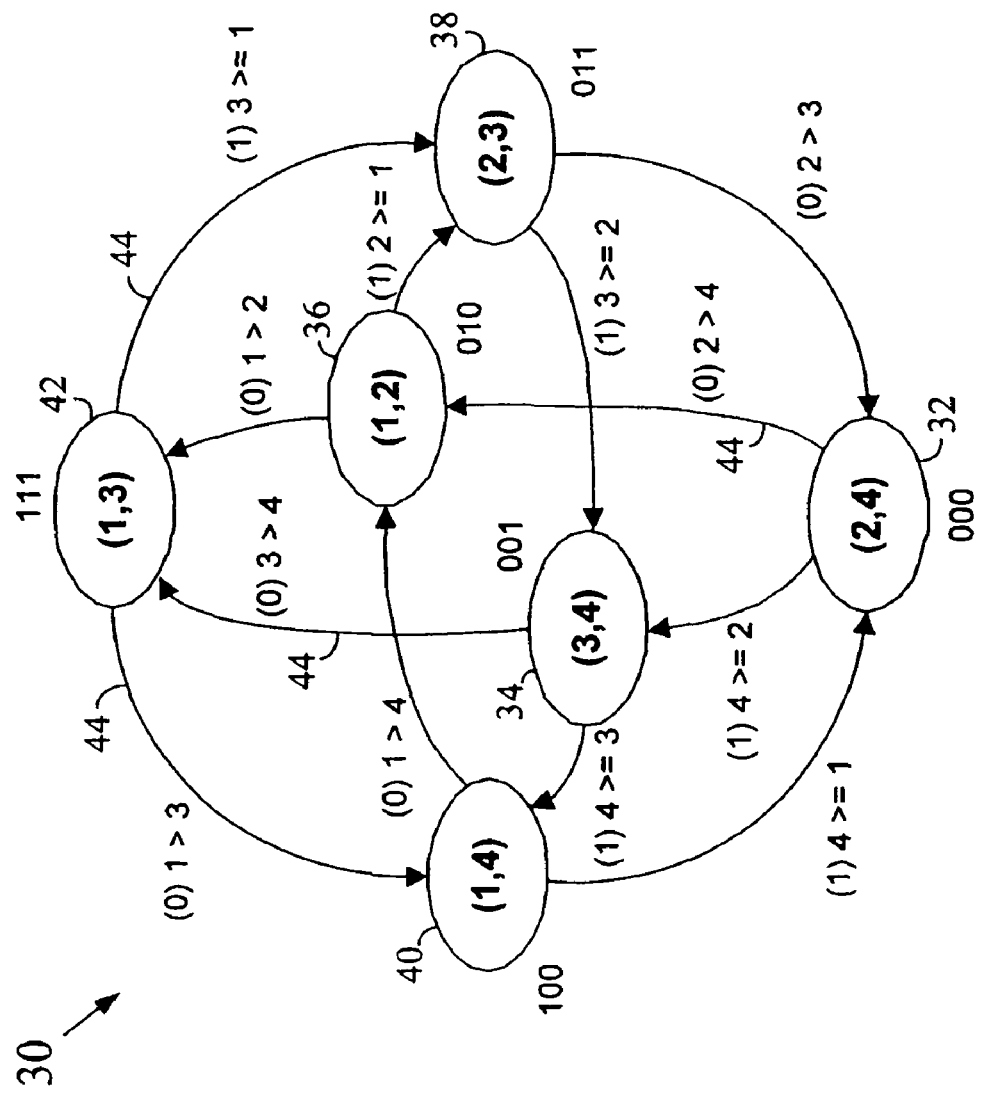
FIG. 2 is a diagram illustrating an example state machine that may be used to perform pseudo four antenna diversity in accordance with an embodiment of the present invention.

In at least one embodiment of the present invention, a state machine approach is used to determine which two antennas will be considered during any particular received packet. FIG. 2 illustrates an example state machine 30 that may be used to determine appropriate antenna pairs, in a system having four antennas, in accordance with an embodiment of the present invention. The ovals 32, 34, 36, 38, 40, 42 in FIG. 2 represent the different diversity states (i.e., 000, 001, 010, 011, 100, and 111, respectively) that the state machine 30 may assume at various points in time. As shown, each state has a pair of antennas associated with it (indicated in parentheses). In the illustrated embodiment, the antenna pairs are assigned to states as follows:

| STATES | ANTENNAS |
|---|---|
| 000 | 2 and 4 |
| 001 | 3 and 4 |
| 010 | 1 and 2 |
| 011 | 2 and 3 |
| 100 | 1 and 4 |
| 111 | 1 and 3 |

When the state machine 30 is in a particular state (e.g., state "001"), the associated antennas (e.g., antenna 3 and antenna 4) will be tested during a corresponding received packet and one of the two antennas will be selected to receive a payload portion of the packet. As shown in FIG. 2, the state machine 30 also includes a number of paths 44 between states. The paths 44 between states indicate, for each state, the possible next states that may be entered by the state machine 30. For example, with reference to FIG. 2, when the state machine 30 is in state "001" 34, it may next go to either state "111" 42 or state "100" 40.

The actual path that is taken from a current state may depend upon which antenna within the current state is selected to receive the payload portion of the corresponding packet. As illustrated in FIG. 2, each path 44 has a label indicating the path number (in parentheses) and the corresponding antenna selection condition that will result in that path being chosen. For example, state "111" 42 has one path leading to state "100" 40 that is labeled "(0) 1>3" and one path leading to state "011" 38 that is labeled "(1) 3>=1." Thus, if a measured quality metric of antenna 1 is greater than a measured quality metric of antenna 3, then antenna 1 will be selected and the next state will be state "100" 40; otherwise, antenna 3 will be selected and the next state will be state "011" 38. As will be described in greater detail, the path number within each label may be used within corresponding logic circuitry to identify which antenna has actually been selected. As will be appreciated, the state machine 30 is merely an example of one possible state machine that may be used within a two antenna per packet diversity arrangement. Many alternative state machine configurations also exist. The number of states in a state machine will typically depend upon the number of antennas within a particular implementation.

In at least one embodiment of the present invention, a state machine for use in selecting a next diversity state is implemented using digital logic circuits. For example, the state machine 30 of FIG. 2 may be represented using the following Boolean equations:

$$A' = B\overline{CI} + AC\overline{I} + \overline{B}C$$

$$B' = \overline{A}B\overline{C} + ACI + \overline{CI} + \overline{BI}$$

$$C' = \overline{AB}\overline{C} + \overline{B}C\overline{I} + \overline{AB}\overline{C} + BI$$

where A, B, and C represent the current state (e.g., state "010" has A=0, B=1, and C=0); A', B', and C' represent the next state; and I represents the antenna selection decision (e.g., the number in parentheses in the path labels of FIG. 2). Methods for implementing Boolean logic equations using digital logic circuitry (e.g., logic gates, etc.) are well known in the art. Software based state machine implementations may alternatively be used.

Figure 3:
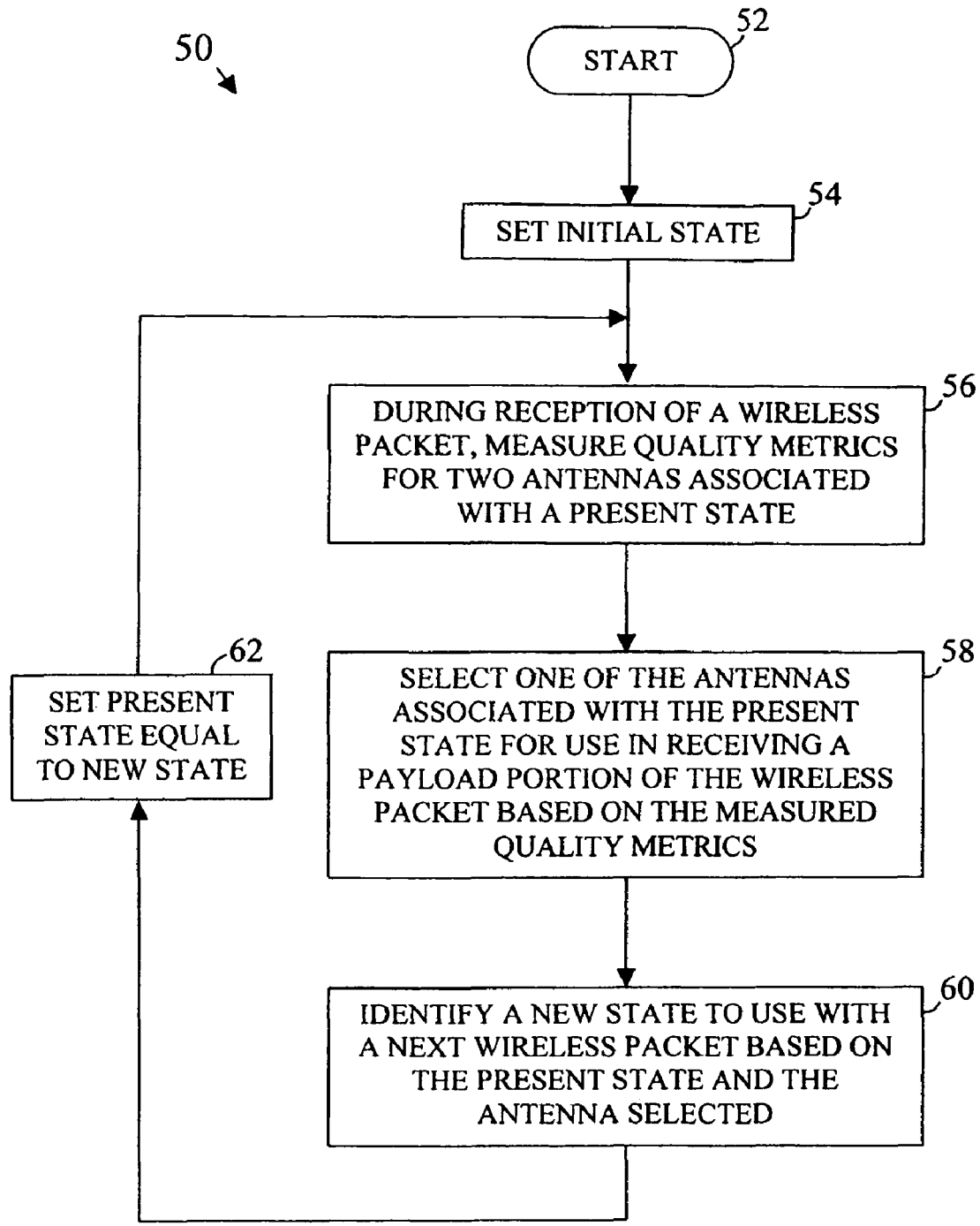
FIG. 3 is a flowchart illustrating an example method for implementing multiple antenna diversity using two antenna per packet diversity in accordance with an embodiment of the present invention.

FIG. 3 is a flowchart illustrating an example method 50 for implementing multiple antenna diversity using two antenna per packet diversity in accordance with an embodiment of the present invention. As illustrated, the method 50 starts at block 52. An initial state may then be set (block 54). For example, when implementing the state machine 30 of FIG. 2, it may be decided that the state "000" 32 will be used as an initial state. A wireless packet will eventually be received. During reception of this packet, quality metrics may be measured for the two antennas associated with the present state (block 56). In at least one embodiment, the quality metrics are related to received signal strength (e.g., a received signal strength indication (RSSI) in an IEEE 802.11 based implementation, signal-to-noise ratio (SNR), etc.), although other types of quality metrics may alternatively be used. One of the antennas associated with the present state may then be selected for use in receiving a payload portion of the present wireless packet based on the corresponding measured quality metrics (block 58). For example, if a signal strength associated with one antenna of the present state is greater than a signal strength associated with the other antenna of the present state, the first antenna may be selected to receive the corresponding payload portion. A new diversity state is then identified for use with a next received wireless packet based on the present state and the antenna selected therefrom (block 60). For example, when implementing the state machine 30 of FIG. 2, if the present state is "010" and antenna 2 is selected (because antenna 2's measured quality metric is greater than that of antenna 1), the new state will be state "011." After the new state has been identified, the present state may be set equal to the new state (block 62) and blocks 56, 58, and 60 may be repeated for the next wireless packet received, and so on.

Figure 4:
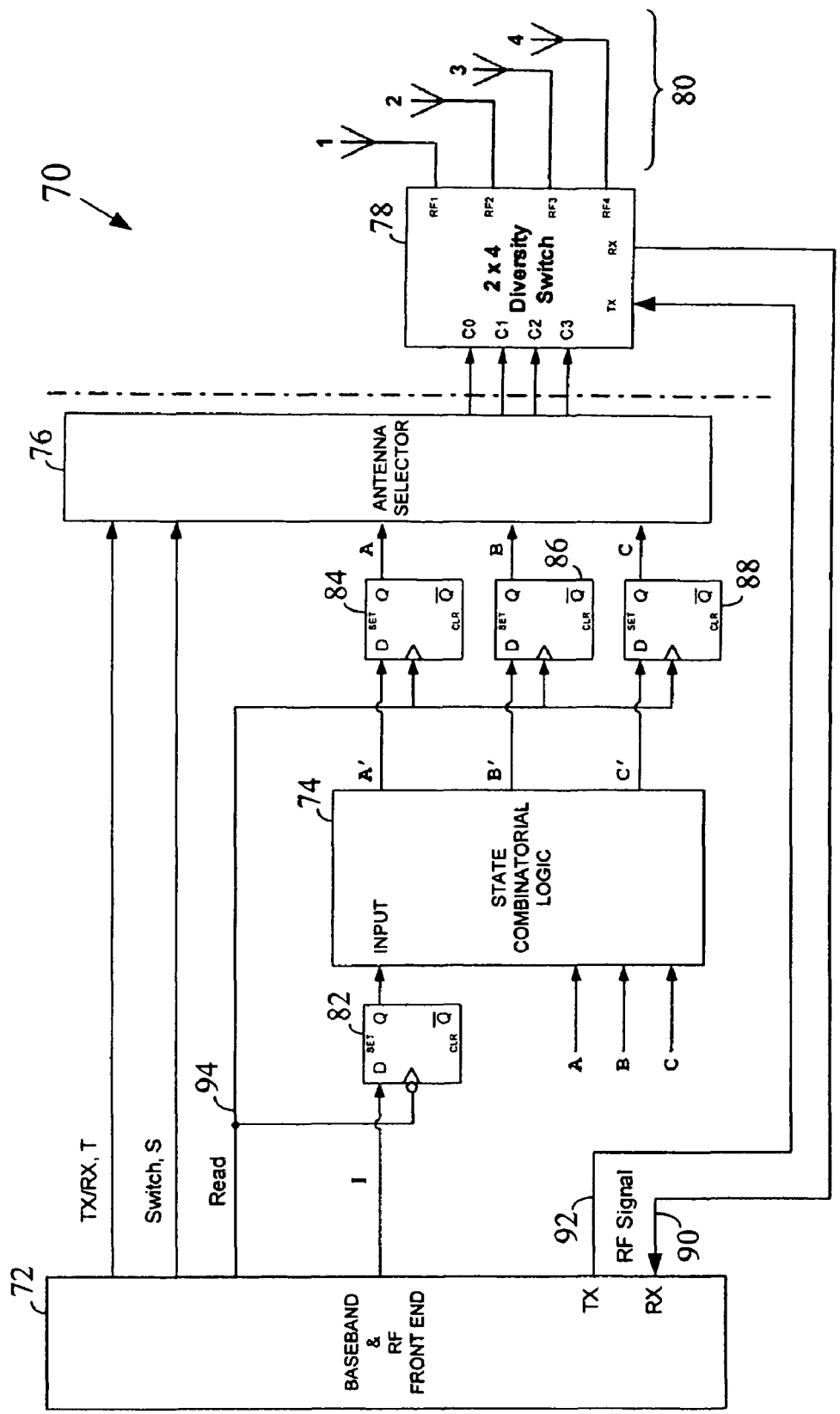
FIG. 4 is a block diagram illustrating another example wireless communication device in accordance with an embodiment of the present invention.

FIG. 4 is a block diagram illustrating an example wireless communication device 70 in accordance with an embodiment of the present invention. As illustrated, the wireless communication device 70 includes: a baseband and RF front end 72, a state combinatorial logic unit 74, an antenna selector 76, a switch 78, a plurality of antennas 80, and a number of D-type flip flops 82, 84, 86, and 88. The baseband and RF front end 72 is representative of both the wireless transceiver functionality and the baseband processing functionality of the wireless communication device 70. During receive operations, the baseband and RF front end 72 may input received signals (e.g., at port 90) from the switch 78 and appropriately process the received signals. During transmit operations, the baseband and RF front end 72 may output transmit signals (e.g., at port 92) to the switch 78 for transmission from a selected antenna. When a wireless packet is being received by the device 70, the baseband and RF front end 72 may input a receive signal portion from each of two antennas associated with a present diversity state. These receive signal portions may be from a header of the wireless packet. As used herein, the term "header" is intended to include any or all portions of a packet that precede a payload portion thereof (e.g., headers, preambles, prefixes, etc.). The baseband and RF front end 72 may measure a quality metric for each antenna and then select one of the two antennas, based on the quality metrics, for use in receiving the payload portion of the packet. The selected antenna may be indicated by a variable I output by the baseband and RF front end 72 (e.g., the number in parentheses within each path label in the state machine 30 of FIG. 2 may be used as the variable I).

The antenna selector 76 is operative for generating the antenna selection control signals (e.g., C0, C1, C2, and C3) that are delivered to the switch 78 during operation of the wireless communication device 70 to couple an appropriate antenna to the baseband and RF front end 72. The antenna selector 76 may receive an indication of the diversity state of the wireless communication device 70 at corresponding inputs thereof. The antenna selector 76 may also receive a signal T at an input thereof that indicates a current mode of the baseband and RF front end 72 (e.g., T=1 for transmit mode and T=0 for receive mode, etc.). This will enable the antenna selector 76 to apply the appropriate selection control signals to the switch 78 for either transmit or receive mode. During a transmit operation, the antenna selector 76 may select the same antenna that was used to receive the payload portion of a most recently received wireless packet (although other techniques for selecting a transmit antenna may alternatively be used). During a receive operation, the antenna selector 76 will switch between the two antennas associated with the present diversity state during packet reception so that appropriate measurements may be taken by the baseband and RF front end 72. The baseband and RF front end 72 may deliver a switch signal (S) to the antenna selector 76 indicating when the switch is to be made between the two antennas. Table 2 below is an example truth table that may be implemented by the antenna selector 76.

Figure 5:
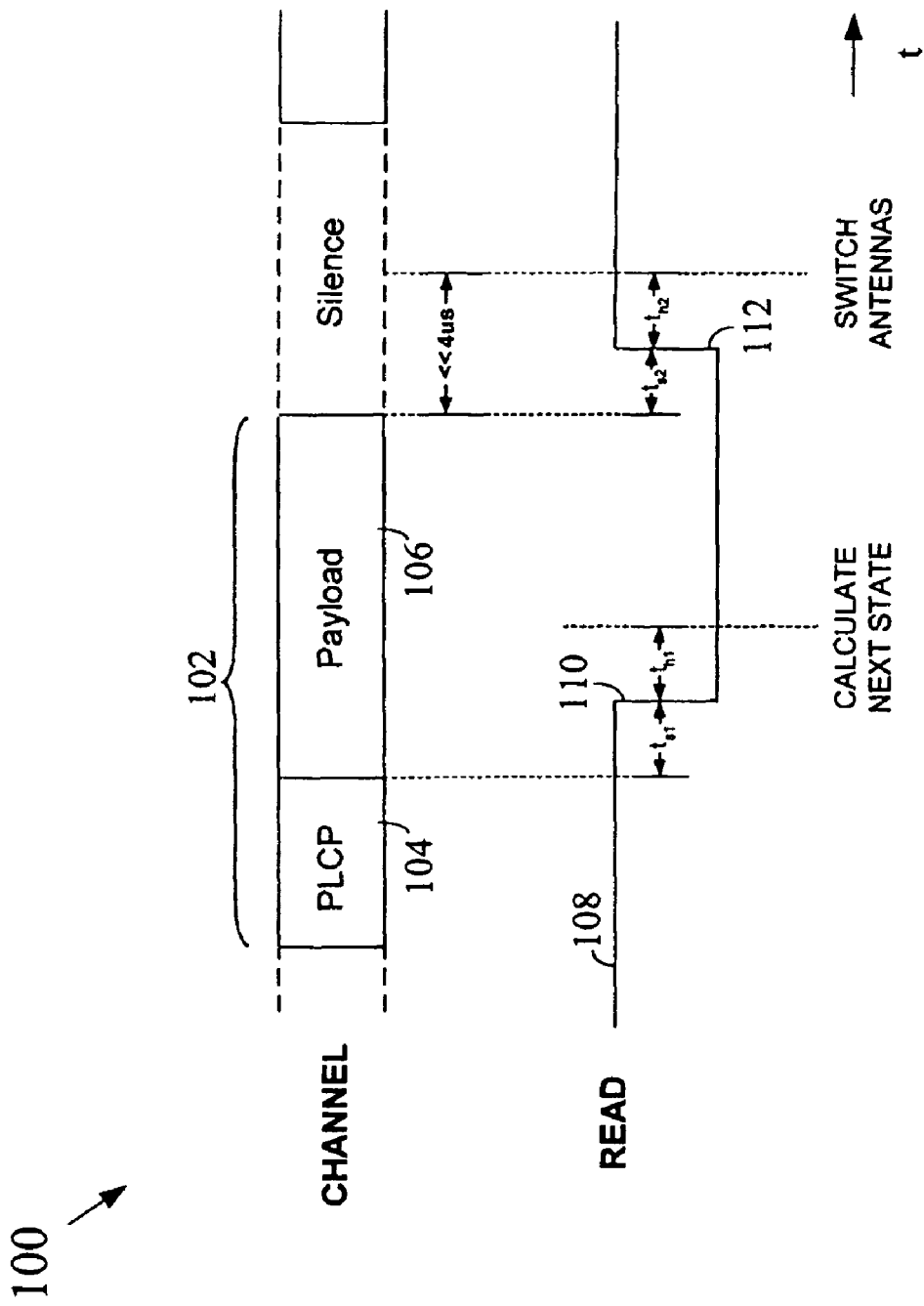
FIG. 5 is a timing diagram illustrating an example timing scheme that may be used within a wireless communication device in accordance with an embodiment of the present invention.

The state combinatorial logic 74 is operative for determining the diversity state (A', B' C') to use with the next wireless packet received based on the current state (A, B, C) and the antenna selected for the current packet (I). In at least one embodiment, the state combinatorial logic 74 will include a digital circuit implementation of a corresponding state machine. The flip flops 82, 84, 86, 88 are operative for updating inputs to the state combinatorial logic 74 and the antenna selector 76, respectively, at the appropriate times. The baseband and RF front end 72 may generate a READ signal 94 that is delivered to the clock inputs of the flip flops 82, 84, 86, 88 to control the latching. FIG. 5 is a timing diagram illustrating an example timing scheme 100 that may be used within the wireless communication device 70 in an embodiment of the present invention. As illustrated in FIG. 5, a wireless packet 102 may be received by the device 70 within a corresponding communication channel. The wireless packet 102

TABLE 2

| State ABC | Switch S | Tx/Rx T | Antenna Selection | Output C |
|---|---|---|---|---|
| 000 | 0 | 0 | (2,4) | 0010 |
|  |  | 1 |  | 0001 |
|  | 1 | 0 |  | 0001 |
|  |  | 1 |  | 0010 |
| 001 | 0 | 0 | (3,4) | 1000 |
|  |  | 1 |  | 0100 |
|  | 1 | 0 |  | 0001 |
|  |  | 1 |  | 0010 |
| 010 | 0 | 0 | (1,2) | 0100 |
|  |  | 1 |  | 1000 |
|  | 1 | 0 |  | 0010 |
|  |  | 1 |  | 0001 |
| 011 | 0 | 0 | (2,3) | 0010 |
|  |  | 1 |  | 0001 |
|  | 1 | 0 |  | 1000 |
|  |  | 1 |  | 0100 |
| 100 | 0 | 0 | (1,4) | 0100 |
|  |  | 1 |  | 1000 |
|  | 1 | 0 |  | 0001 |
|  |  | 1 |  | 0010 |
| 111 | 0 | 0 | (1,3) | 0100 |
|  |  | 1 |  | 1000 |
|  | 1 | 0 |  | 1000 |
|  |  | 1 |  | 0100 | may have a header portion 104 (e.g., a PLCP in an IEEE 802.11 based implementation) and a payload portion 106. As described above, a READ signal 108 may be generated by the baseband and RF front end 72 to control timing in the device 70. As illustrated, the READ signal 108 may include a transition 110 from one value to another a short setup time ($t_{s1}$) after the end of the header portion 104. Sometime before (or at) the end of the header portion 104, an antenna selection decision I is made for the current diversity state and the selected antenna is coupled to the baseband and RF front end 72. The flip flop 82 is designed to clock on the transition 110 in the READ signal 108 (which is a falling edge in the illustrated embodiment). When the flip flop 82 clocks, the latest value of I is latched to an output of the flip flop 82 and thus appears at the input of the state combinatorial logic unit 74. A short hold time ($t_{h1}$) after this point, the state combinatorial logic 74 may calculate the next state (A', B', C').

As shown in FIG. 5, the READ signal 108 may include another transition 112 a short setup time ($t_{s2}$) after the end of the payload portion 106. The flip flops 84, 86, 88 may be designed to clock on this transition 112 in the READ signal 108 (which is a rising edge in the illustrated embodiment). When the flip flops 84, 86, 88 clock, the new state information (A', B', C') will latch to the outputs of the flip flops 84, 86, 88 and thus appear at the corresponding inputs of the antenna selector 76. A short hold time ($t_{h2}$) after this point, the antenna selector 76 may be permitted to switch the antenna selection control signals (C0, C1, C2, and C3) to a first antenna within the new diversity state. Eventually, another wireless packet will be received and the above described process will repeat. The setup times $t_{s1}$ and $t_{s2}$ and the hold times $t_{h1}$ and $t_{h2}$ may be associated with the corresponding flip flops 82, 84, 86, 88 and may be on the order of, for example, approximately 10 nanoseconds (ns).

The techniques and structures of the present invention may be implemented in any of a variety of different forms. For example, features of the invention may be embodied within personal digital assistants (PDAs) having wireless capability; laptop, palmtop, desktop, and tablet computers having wireless capability; cellular telephones and other handheld wireless communicators; pagers; satellite communicators; wireless network interface cards (NICs) and other network interface structures; integrated circuits; as instructions and/or data structures stored on machine readable media; and/or in other formats. Examples of different types of machine readable media that may be used include floppy diskettes, hard disks, optical disks, compact disc read only memories (CD-ROMs), magneto-optical disks, read only memories (ROMs), random access memories (RAMs), erasable programmable ROMs (EPROMs), electrically erasable programmable ROMs (EEPROMs), magnetic or optical cards, flash memory, and/or other types of media suitable for storing electronic instructions or data. In at least one form, the invention is embodied as a set of instructions that are modulated onto a carrier wave for transmission over a transmission medium.

It should be appreciated that the individual blocks illustrated in the block diagrams herein may be functional in nature and do not necessarily correspond to discrete hardware elements. For example, in at least one embodiment, two or more of the blocks are implemented in software within a single (or multiple) digital processing device(s). The digital processing device(s) may include, for example, a general purpose microprocessor, a digital signal processor (DSP), a reduced instruction set computer (RISC), a complex instruction set computer (CISC), a field programmable gate array (FPGA), an application specific integrated circuit (ASIC), and/or others, including combinations of the above. Hardware, software, firmware, and hybrid implementations may be used.

In the foregoing detailed description, various features of the invention are grouped together in one or more individual embodiments for the purpose of streamlining the disclosure. This method of disclosure is not to be interpreted as reflecting an intention that the claimed invention requires more features than are expressly recited in each claim. Rather, as the following claims reflect, inventive aspects may lie in less than all features of each disclosed embodiment.

Although the present invention has been described in conjunction with certain embodiments, it is to be understood that modifications and variations may be resorted to without departing from the spirit and scope of the invention as those skilled in the art readily understand. Such modifications and variations are considered to be within the purview and scope of the invention and the appended claims.

What is claimed is:

1. A method for use with a wireless device having at least three antennas, said method comprising:
    measuring a quality metric for each antenna associated with a first diversity state during reception of a first wireless packet, said first diversity state being one of a plurality of predefined diversity states, wherein each diversity state within said plurality of predefined diversity states has two associated antennas;
    selecting one of said antennas associated with said first diversity state to receive a payload portion of said first wireless packet based on said measured quality metrics; and
    identifying with a state machine a next diversity state in the plurality of predefined diversity states for use during reception of a next wireless packet based on (a) said first diversity state and (b) said antenna selected from said first diversity state to receive said payload portion of said first wireless packet;
    setting a present diversity state equal to the next diversity state; and
    for each new wireless packet received after said next wireless packet, identifying a diversity state to use during reception of said new wireless packet based on a diversity state used during reception of a previous wireless packet and an antenna selected from said diversity state used during reception of said previous wireless packet.

2. The method of claim 1, wherein:
    said quality metric includes received signal strength.

3. The method of claim 1, further comprising:
    measuring a quality metric for each antenna associated with said next diversity state during reception of said next wireless packet; and
    selecting one of said antennas associated with said next diversity state to receive a payload portion of said next wireless packet based on said quality metrics measured for said next diversity state.

4. The method of claim 1, wherein:
    measuring a quality metric for each antenna associated with a first diversity state includes measuring said quality metrics during reception of a header portion of said first wireless packet.

5. The method of claim 4, wherein:
    selecting is performed during reception of said header portion of said first wireless packet.

6. The method of claim 1, wherein:
    said at least three antennas consists of four sectored antennas including a first antenna, a second antenna, a third antenna, and a fourth antenna.

7. The method of claim 6, wherein:
    said plurality of predefined diversity states consists of: one diversity state associated with said second and fourth antennas, another diversity state associated with said third and fourth antennas, another diversity state associated with said first and second antennas, another diversity state associated with said second and third antennas, another diversity state associated with said first and fourth antennas, and another diversity state associated with said first and third antennas.

8. The method of claim 6, wherein:
said four sectored antennas each cover a corresponding 90 degree sector.

9. An apparatus comprising:
a wireless receiver;
a switch to controllably couple a selected one of a plurality of antennas to said wireless receiver in response to one or more control signals, said plurality of antennas having at least three antennas;
a state machine to determine a diversity state for a next wireless packet to be received by said wireless receiver, said state machine having a plurality of diversity states, each diversity state in said plurality of diversity states having two associated antennas to be considered for use during reception of a corresponding wireless packet, wherein one of said two associated antennas will be selected to receive a payload portion of the corresponding wireless packet based on measured performance metrics, wherein said state machine determines a diversity state for said next wireless packet based on a diversity state of a previously received wireless packet and an antenna selected from said diversity state of said previously received wireless packet to receive a payload portion of said previously received wireless packet; and
an antenna selector to generate said one or more control signals directly for said switch, said antenna selector coupled to receive an indication of said diversity state for said next wireless packet determined by said state machine and to use said indication to generate said one or more control signals.

10. The apparatus of claim 9, wherein:
said state machine determines a new diversity state for each successive wireless packet received by said wireless receiver.

11. The apparatus of claim 9, wherein:
said state machine is implemented using digital logic circuitry.

12. The apparatus of claim 9, wherein:
said antenna selector includes an input to receive an indication of when to switch from one antenna associated with a present diversity state to the other antenna associated with the present diversity state.

13. The apparatus of claim 9, wherein:
said wireless receiver is part of a wireless transceiver; and
said antenna selector includes an input to receive an indication of a current mode of said wireless transceiver, said current mode being one of: a transmit mode and a receive mode.

14. An apparatus comprising:
at least three sectored antennas;
a wireless receiver;
a switch to controllably couple a selected one of said at least three sectored antennas to said wireless receiver in response to one or more control signals;
a state machine to determine a diversity state for a next wireless packet to be received by said wireless receiver, said state machine having a plurality of diversity states, each diversity state in said plurality of diversity states having two associated antennas to be considered for use during reception of a corresponding wireless packet, wherein one of said two associated antennas will be selected to receive a payload portion of the corresponding wireless packet based on measured performance metrics, wherein said state machine determines a diversity state for said next wireless packet based on a diversity state of a previously received wireless packet and an antenna selected from said diversity state of said previously received wireless packet to receive a payload portion of said previously received wireless packet; and
an antenna selector to generate said one or more control signals directly for said switch, said antenna selector coupled to receive an indication of said diversity state for said next wireless packet determined by said state machine and to use said indication to generate said one or more control signals.

15. The apparatus of claim 14, wherein:
said at least three sectored antennas consists of four sectored antennas including a first antenna, a second antenna, a third antenna, and a fourth antenna.

16. The apparatus of claim 15, wherein:
said plurality of diversity states includes: one diversity state associated with said second and fourth antennas, another diversity state associated with said third and fourth antennas, another diversity state associated with said first and second antennas, another diversity state associated with said second and third antennas, another diversity state associated with said first and fourth antennas, and another diversity state associated with said first and third antennas.

17. An article comprising a non-transitory computer readable storage medium having instructions stored thereon that, when executed by a computing platform, operate to:
measure, within a wireless communication device having at least three antennas, a quality metric for each antenna associated with a first diversity state during reception of a first wireless packet, said first diversity state being one of a plurality of predefined diversity states, wherein each diversity state within said plurality of predefined diversity states has two associated antennas;
select one of said antennas associated with said first diversity state to receive a payload portion of said first wireless packet based on said measured quality metrics;
identify a next diversity state for use during reception of a next wireless packet based on said first diversity state and said antenna selected from said first diversity state to receive said payload portion of said first wireless packet;
set a present diversity state equal to the next diversity state; and
for each new wireless packet received after said next wireless packet, identifying a diversity state to use during reception of said new wireless packet based on a diversity state used during reception of a previous wireless packet and an antenna selected from said diversity state used during reception of said previous wireless packet.

18. The article of claim 17, wherein:
said quality metric includes received signal strength.

19. The article of claim 17, wherein said instructions further operate to:
measure a quality metric for each antenna associated with said next diversity state during reception of said next wireless packet; and
select one of said antennas associated with said next diversity state to receive a payload portion of said next wireless packet based on said quality metrics measured for said next diversity state.

20. The article of claim 19, wherein said instructions further operate to:
for each new wireless packet received after said next wireless packet, identify a diversity state to use during reception of said new wireless packet based on a diversity state used during reception of a previous wireless packet and an antenna selected from said diversity state used during reception of said previous wireless packet.

21. The article of claim 17, wherein:
said at least three antennas consists of four sectored antennas.

* * * * *